(12) United States Patent
Song

(10) Patent No.: US 12,407,025 B2
(45) Date of Patent: Sep. 2, 2025

(54) LITHIUM SECONDARY BATTERY

(71) Applicant: LG ENERGY SOLUTION, LTD., Seoul (KR)

(72) Inventor: Myeongjun Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 726 days.

(21) Appl. No.: 17/605,761

(22) PCT Filed: Jun. 22, 2020

(86) PCT No.: PCT/KR2020/008043
§ 371 (c)(1),
(2) Date: Oct. 22, 2021

(87) PCT Pub. No.: WO2021/010605
PCT Pub. Date: Jan. 21, 2021

(65) Prior Publication Data
US 2022/0231342 A1     Jul. 21, 2022

(30) Foreign Application Priority Data

Jul. 16, 2019 (KR) .......... 10-2019-0085623
Jun. 17, 2020 (KR) .......... 10-2020-0073784

(51) Int. Cl.
*H01M 10/00* (2006.01)
*H01M 4/04* (2006.01)
(Continued)

(52) U.S. Cl.
CPC ..... *H01M 10/0569* (2013.01); *H01M 4/0404* (2013.01); *H01M 4/1393* (2013.01);
(Continued)

(58) Field of Classification Search
CPC ........ H01M 4/38; H01M 4/362; H01M 4/625; H01M 10/0525; H01M 2004/021;
(Continued)

(56) References Cited

U.S. PATENT DOCUMENTS 6,194,099 B1 * 2/2001 Gernov ................. H01M 4/625
29/623.5
12,021,224 B2 * 6/2024 Lee .................... H01M 10/0569
(Continued)

FOREIGN PATENT DOCUMENTS

| CN | 106169610 A | 11/2016 |
| CN | 107210421 A | 9/2017 |

(Continued)

OTHER PUBLICATIONS

Arakawa, "Introduction to Particle Size Measurement", Journal of the Japan Society of Powder Technology, vol. 17, No. 6, 1980, pp. 299-307 (26 pages total), with an English translation.
(Continued)

*Primary Examiner* — Nicholas P D'Aniello
(74) *Attorney, Agent, or Firm* — Birch, Stewart, Kolasch & Birch, LLP

(57) ABSTRACT

Disclosed is a lithium secondary battery, and in particular, a lithium secondary battery capable of obtaining high energy density and long lifetime compared to conventional lithium secondary batteries by including positive electrode slurry having a particle size (based on $D_{50}$) of 15 μm to 50 μm and specifying a condition of an electrolyte liquid.

12 Claims, 1 Drawing Sheet

(51) Int. Cl.
  *H01M 4/1393* (2010.01)
  *H01M 4/38* (2006.01)
  *H01M 4/583* (2010.01)
  *H01M 4/62* (2006.01)
  *H01M 10/0525* (2010.01)
  *H01M 10/0568* (2010.01)
  *H01M 10/0569* (2010.01)
  *H01M 4/02* (2006.01)

(52) U.S. Cl.
  CPC ............ *H01M 4/38* (2013.01); *H01M 4/583* (2013.01); *H01M 4/625* (2013.01); *H01M 10/0525* (2013.01); *H01M 10/0568* (2013.01); *H01M 2004/021* (2013.01); *H01M 2004/028* (2013.01); *H01M 2300/0037* (2013.01)

(58) Field of Classification Search
  CPC ....... H01M 2004/028; H01M 2220/20; H01M 2300/0037; H01M 2300/0034; H01M 4/13; H01M 4/139; H01M 4/382; H01M 10/0569; H01M 10/052; Y02E 60/10
  See application file for complete search history.

(56) References Cited

U.S. PATENT DOCUMENTS

| | | | |
|---|---|---|---|
| 12,087,941 B2 * | 9/2024 | Cho | H01M 4/139 |
| 12,100,831 B2 * | 9/2024 | Song | H01M 50/417 |
| 2011/0143218 A1 | 6/2011 | Issaev et al. | |
| 2013/0040186 A1 | 2/2013 | Takase | |
| 2013/0164626 A1 | 6/2013 | Manthiram et al. | |
| 2013/0280800 A1 | 10/2013 | Uehara et al. | |
| 2013/0337347 A1 * | 12/2013 | Pol | H01M 4/583 568/18 |
| 2014/0322618 A1 | 10/2014 | Braun | |
| 2016/0181600 A1 | 6/2016 | Omoda et al. | |
| 2016/0293960 A1 | 10/2016 | Kim | |
| 2016/0344063 A1 | 11/2016 | Chang et al. | |
| 2017/0098858 A1 | 4/2017 | Kim et al. | |
| 2017/0352909 A1 | 12/2017 | Ainsworth et al. | |
| 2017/0352920 A1 | 12/2017 | Kawai et al. | |
| 2018/0062206 A1 | 3/2018 | Yang et al. | |
| 2018/0175375 A1 | 6/2018 | Lecuyer et al. | |
| 2018/0248227 A1 | 8/2018 | Park et al. | |
| 2018/0301739 A1 | 10/2018 | Park et al. | |
| 2021/0328209 A1 | 10/2021 | Lee et al. | |

FOREIGN PATENT DOCUMENTS

| | | |
|---|---|---|
| EP | 3 480 881 A1 | 5/2019 |
| JP | 2013-513219 A | 4/2013 |
| JP | 2013-191331 A | 9/2013 |
| JP | 2015-505825 A | 2/2015 |
| JP | 2015-506899 A | 3/2015 |
| JP | 2016-119165 A | 6/2016 |
| JP | 2017-178859 A | 10/2017 |
| JP | 2018-60647 A | 4/2018 |
| JP | 2019-505984 A | 2/2019 |
| KR | 10-0463437 B1 | 12/2004 |
| KR | 10-2010-0113553 A | 10/2010 |
| KR | 10-2013-0018511 A | 2/2013 |
| KR | 10-1379716 B1 | 3/2014 |
| KR | 10-2015-0014793 A | 2/2015 |
| KR | 10-2015-0088913 A | 8/2015 |
| KR | 10-2015-0123746 A | 11/2015 |
| KR | 10-2016-0037084 A | 4/2016 |
| KR | 10-2018-0074377 A | 6/2018 |
| KR | 10-2016-0118597 A | 10/2016 |
| KR | 10-2017-0003534 A | 1/2017 |
| KR | 10-2017-0039580 A | 4/2017 |
| KR | 10-2017-0084453 A | 7/2017 |
| KR | 10-2017-0092455 A | 8/2017 |
| KR | 10-2017-0121047 A | 11/2017 |
| KR | 10-1804615 B1 | 12/2017 |
| KR | 10-1978130 B1 | 5/2019 |
| KR | 10-2019-0063699 A | 6/2019 |
| KR | 10-2020-0060258 A | 5/2020 |
| WO | WO 2009/089018 A2 | 7/2009 |
| WO | WO 2017/123544 A1 | 7/2017 |
| WO | WO 2018/007665 A1 | 1/2018 |
| WO | WO 2019/049826 A1 | 3/2019 |
| WO | WO 2020/105980 A1 | 5/2020 |

OTHER PUBLICATIONS

Fotouhi et al., "Lithium-Sulfur Battery Technology Readiness and Applications—A Review," Energies 2017, vol. 10, No. 12: 1937, pp. 1-15.

International Search Report (PCT/ISA/210) issued in PCT/KR2020/008043, dated Oct. 8, 2020.

Yang et al., "Structural Design of Lithium-Sulfur Batteries: From Fundamental Research to Practical Application," Electrochemical Energy Reviews, vol. 1, 2018, pp. 239-293.

Extended European Search Report for European Application No. 20840658.7, dated May 23, 2022.

Cheng, "Solvent Hand," Chemical Industry Press, 2nd Edition, pp. 649, 652-653 (15 pages total), May 31, 1999, with English translation.

Cuisinier et al., "Unique behaviour of nonsolvents for polysulphides in lithium—sulphur batteries," Energy & Environmental Science, vol. 7, 2014, pp. 2697-2705.

* cited by examiner

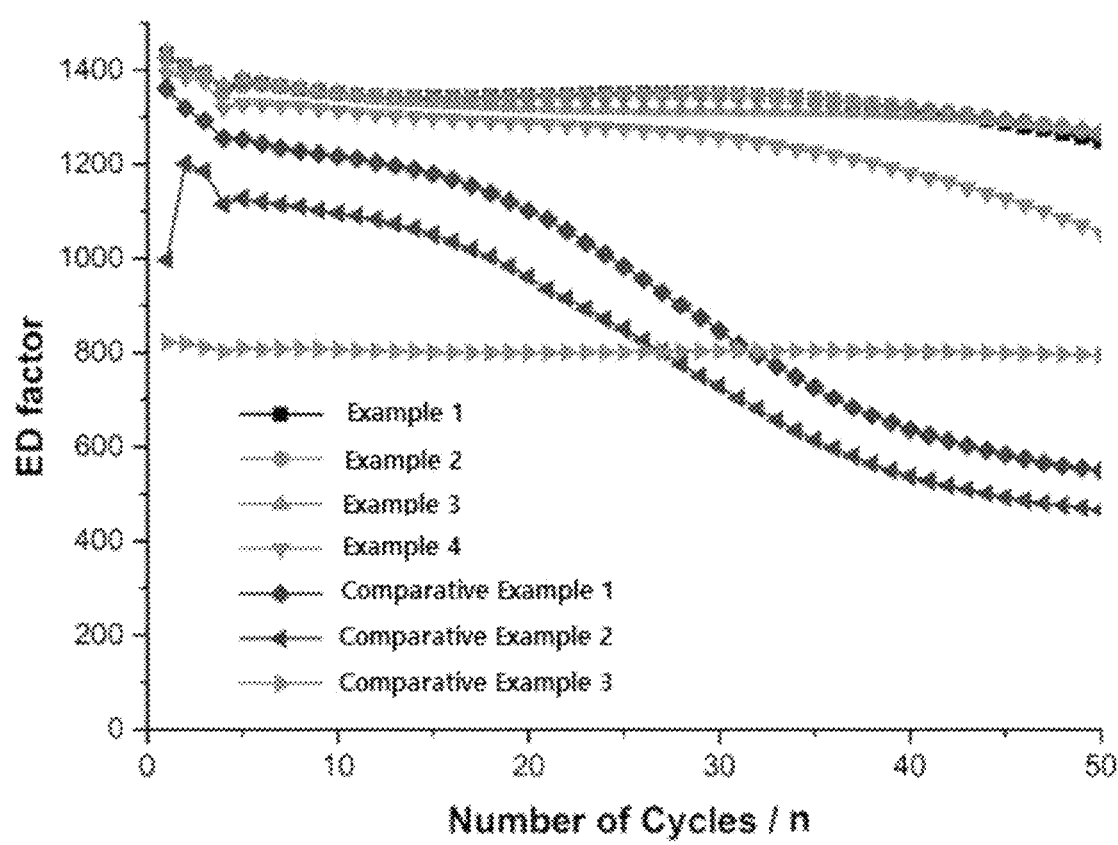

LITHIUM SECONDARY BATTERY

TECHNICAL FIELD

This application claims the benefits of Korean Patent Application No. 10-2019-0085623 on Jul. 16, 2019 with the Korean Intellectual Property Office, and Korean Patent Application No. 10-2020-0073784 on Jun. 17, 2020 with the Korean Intellectual Property Office, the disclosure of which are herein incorporated by reference in their entirety.

The present invention relates to a lithium secondary battery.

BACKGROUND ART

As application areas of secondary batteries expand to electric vehicles (EV), energy storage systems (ESS) or the like, lithium-ion secondary batteries having relatively low weight to energy storage density (~250 Wh/kg) have limits in applications for such products. On the other hand, a lithium-sulfur secondary battery has high theoretical energy density (~2,600 Wh/kg), and thereby has received attention as a next generation secondary battery technology.

A lithium-sulfur secondary battery is a battery system using a sulfur-based material having a sulfur-sulfur bond as a positive electrode active material, and lithium metal as a negative electrode active material. Such a lithium-sulfur secondary battery has advantages in that sulfur, a main material of the positive electrode active material, is very abundant in resources globally, has no toxicity and has a low atomic weight.

During discharge of a lithium-sulfur secondary battery, lithium, a negative electrode active material, is oxidized while releasing electrons and being ionized, and a sulfur-based material, a positive electrode active material, is reduced by receiving the electrons. At this time, the oxidation reaction of lithium is a process in which lithium metal releases electrons and changes into a lithium cation form. In addition, the reduction reaction of sulfur is a process in which a sulfur-sulfur bond receives two electrons and changes into a sulfur anion form. The lithium cation produced through the oxidation reaction of lithium is transferred to a positive electrode through an electrolyte, and forms a salt by bonding with the sulfur anion produced through the reduction reaction of sulfur. Specifically, sulfur before discharge has a cyclic $S_8$ structure, and this changes to lithium polysulfide ($Li_2S_x$, x=8, 6, 4, 2) through the reduction reaction, and when such lithium polysulfide is fully reduced, lithium sulfide ($Li_2S$) is eventually produced.

Due to low electrical conductivity of sulfur, a positive electrode active material, reactivity with electrons and lithium ions is difficult to secure in a solid-state form. In order to improve such reactivity of sulfur, conventional lithium-sulfur secondary batteries produce intermediate polysulfide in a $Li_2S_x$ form to induce a liquid-state reaction and improve reactivity. Herein, an ether-based solvent such as dioxolane or dimethoxyethane having high solubility for lithium polysulfide is used as a solvent of an electrolyte liquid. In addition, conventional lithium-sulfur secondary batteries build a catholyte-type lithium-sulfur secondary battery system to improve reactivity, and in this case, sulfur reactivity and lifetime properties are affected by the electrolyte liquid content due to properties of lithium polysulfide readily dissolved in the electrolyte liquid. In addition, lean electrolyte conditions are essential for high energy density, however, a lithium polysulfide concentration increases in the electrolyte liquid as the electrolyte liquid decreases making normal battery driving difficult due to a decrease in the active material mobility and an increase in the side reaction.

Such lithium polysulfide elution adversely affects battery capacity and lifetime properties, and various technologies for suppressing lithium polysulfide elution have been proposed.

As one example, Korean Patent Application Publication No. 2016-0037084 discloses that using a carbon nanotube aggregate having a three-dimensional structure coated with graphene as a carbon material may prevent lithium polysulfide elution, and enhance conductivity of a sulfur-carbon nanotube composite.

In addition, Korean Patent No. 1379716 discloses that, by using a sulfur-including graphene composite, which is prepared through a method of treating graphene with hydrofluoric acid to form a pore on the graphene surface, and growing sulfur particles in the pore, as a positive electrode active material, lithium polysulfide elution is suppressed and as a result, a decrease in the battery capacity may be minimized.

By varying structures or materials of a sulfur-carbon composite used as a positive electrode active material, these patents have somewhat improved a problem of performance decline in a lithium-sulfur secondary battery through preventing lithium polysulfide elution, however, the effects are not sufficient. Accordingly, in order to build a lithium-sulfur secondary battery with high energy density, a battery system capable of driving a high loading and low porosity electrode is required, and studies on such a battery system have been continuously conducted in the art.

PRIOR ART DOCUMENTS

Patent Documents

Korean Patent Application Publication No. 10-2016-0037084 (2016 Apr. 5), SULFUR-CARBON NANOTUBE COMPLEX, METHOD OF PREPARING THE SAME, CATHODE ACTIVE MATERIAL FOR LITHIUM-SULFUR BATTERY INCLUDING THE SAME, AND LITHIUM-SULFUR SECONDARY BATTERY INCLUDING THE SAME Korean Patent No. 10-1379716 (2014 Mar. 25), LITHIUM-SULFUR SECONDARY BATTERY HAVING POSITIVE ELECTRODE WHICH IS CONSTRUCTED WITH GRAPHENE COMPOSITE INCLUDING SULFUR, AND A FORMING METHOD THEREOF.

DISCLOSURE

Technical Problem

In view of the above, the inventors of the present invention have manufactured a lithium secondary battery using positive electrode slurry having a controlled particle size and an electrolyte liquid comprising a solvent having a dipole moment of less than a certain value, and have identified that a lithium secondary battery manufactured as above exhibits improved lifetime properties.

Accordingly, an aspect of the present invention provides a lithium secondary battery having improved lifetime properties.

Technical Solution

According to an aspect of the present invention, there is provided a lithium secondary battery including a positive electrode; a negative electrode; a separator interposed therebetween; and an electrolyte liquid, wherein the positive electrode includes positive electrode slurry comprising a sulfur-carbon composite, a binder, and a conductive material, the positive electrode slurry has a particle size (based on $D_{50}$) of 15 μm to 50 μm, the electrolyte liquid comprises a solvent and a lithium salt, and the solvent includes a first solvent having a $DV^2$ factor value represented by the following Mathematical Formula 1 of 1.75 or less; and a second solvent that is a fluorinated ether-based solvent:

$$DV^2 \text{ factor} = \gamma \times \frac{\mu}{DV} \quad \text{[Mathematical Formula 1]}$$

in Mathematical Formula 1, DV is a dipole moment per unit volume (D·mol/L), μ is viscosity of the solvent (cP, 25° C.), and γ is 100 (constant).

Advantageous Effects

A lithium secondary battery of the present invention is effective in enhancing high energy density and lifetime properties when comprising a positive electrode including positive electrode slurry having a particle size (based on $D_{50}$) of 15 μm to 50 μm; and an electrolyte liquid including a first solvent having a $DV^2$ factor value of 1.75 or less and a second solvent that is a fluorinated ether-based solvent.

DESCRIPTION OF DRAWINGS

FIG. 1 shows a graph presenting ED factor values depending on the number of cycles of lithium-sulfur secondary batteries of Experimental Example 1.

BEST MODE

Hereinafter, the present invention will be described in detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present invention are for describing specific embodiments only and do not intend to limit the present inventive. Singular forms used herein include plural forms as well, unless the context clearly indicates otherwise. In the present invention, terms such as 'include' or 'have' are to specify the presence of features, numbers, steps, behaviors, constituents, components or combinations thereof described in the specification, and need to be construed as not excluding the possibility of presence or addition of one or more of other features, numbers, steps, behaviors, constituents, components or combinations thereof in advance.

The term "polysulfide" used in the present specification is a concept including both "polysulfide ion ($S_x^{2-}$, x=8, 6, 4, 2))" and "lithium polysulfide ($Li_2S_x$ or $LiS_x^-$, x=8, 6, 4, 2)".

For properties described in the present specification, when measuring condition and method are not specifically described, the properties are measured using measuring conditions and methods generally used by those skilled in the art.

Among lithium secondary batteries, a lithium-sulfur secondary battery has high discharge capacity and energy density among various lithium secondary batteries, and has received attention as a next-generation secondary battery with an advantage of sulfur used as a positive electrode active material being abundant in resources and low-priced lowering manufacturing costs of the battery, and being environmental-friendly.

However, in conventional lithium-sulfur secondary battery systems, the lithium polysulfide elution described above is not able to be suppressed causing sulfur loss, and as a result, theoretical discharge capacity and theoretical energy density are not fully obtained in actual driving since the amount of sulfur participating in an electrochemical reaction rapidly decreases. Particularly, as well as being floated or precipitated in an electrolyte liquid, the lithium polysulfide eluted as above directly reacts with lithium metal, a negative electrode, and is fixed on a negative electrode surface in a $Li_2S$ form causing a problem of corroding a lithium metal negative electrode and rapidly declining initial capacity and cycle properties after a certain cycle.

In the prior art, methods such as introducing a material capable of suppressing lithium polysulfide elution to a positive electrode or a separator in an additive or protective layer form, changing a structure or material of a positive electrode active material, changing a composition of an electrolyte, and the like, have been proposed. However, an effect of improving lithium polysulfide elution has been insignificant, and there are also disadvantages of having a limitation in the amount of sulfur, a positive electrode active material, to introduce (that is, loading amount), and causing a serious problem in battery stability or being inefficient in terms of process.

In view of the above, in a lithium-sulfur secondary battery comprising a positive electrode, a negative electrode, a separator and an electrolyte liquid, the positive electrode includes positive electrode slurry having low positive electrode active material layer porosity, having a high loading amount of sulfur that is a positive electrode active material, and having a particle size (based on $D_{50}$) of 15 μm to 50 μm in the present invention.

When lowering porosity and increasing a positive electrode active material content in a positive electrode, energy density of a secondary battery including the same generally increases. However, when decreasing porosity of a positive electrode to a minimum and increasing a content of sulfur to a maximum in a lithium-sulfur secondary battery, a ratio of an electrolyte liquid per unit sulfur content decreases and problems caused by lithium polysulfide dissolution and shuttle phenomenon still remain, and as a result, target performance is difficult to obtain when using the above-described positive electrode in the lithium-sulfur secondary battery.

Accordingly, the present invention provides a lithium-sulfur secondary battery having superior lifetime properties while having higher energy density compared to conventional lithium-sulfur secondary batteries in actual operation by, while using positive electrode slurry having a particle size (based on $D_{50}$) of 15 μm to 50 μm, specifying a condition relating to an electrolyte liquid.

In other words, the present invention provides a lithium secondary battery comprising a positive electrode; a negative electrode; a separator interposed therebetween; and an electrolyte liquid, wherein the positive electrode includes positive electrode slurry comprising a sulfur-carbon composite, a binder, and a conductive material, the positive electrode slurry has a particle size (based on $D_{50}$) of 15 µm to 50 µm, the electrolyte liquid comprises a solvent and a lithium salt, and the solvent includes a first solvent having a $DV^2$ factor value represented by the following Mathematical Formula 1 of 1.75 or less; and a second solvent that is a fluorinated ether-based solvent.

$$DV^2 \text{ factor} = \gamma \times \frac{\mu}{DV} \quad \text{[Mathematical Formula 1]}$$

In Mathematical Formula 1, DV is a dipole moment per unit volume (D·mol/L), µ is viscosity of the solvent (cP, 25° C.), and γ is 100 (constant).

In the present invention, the lithium secondary battery may preferably be a lithium-sulfur secondary battery.

Positive Electrode

The positive electrode for a lithium secondary battery of the present invention includes positive electrode slurry comprising a sulfur-carbon composite, a binder, and a conductive material, and the positive electrode slurry has a particle size (based on $D_{50}$) of 15 µm to 50 µm.

Specifically, the positive electrode for a lithium secondary battery of the present invention may include a positive electrode current collector; and a positive electrode active material layer formed on at least one surface of the positive electrode current collector, and the positive electrode active material layer may be formed with positive electrode slurry having a particle size (based on $D_{50}$) of 15 µm to 50 µm.

In the present invention, the particle size of the positive electrode slurry means a particle size of the positive electrode slurry itself finally obtained by mixing a sulfur-carbon composite, a binder, and a conductive material in a solvent. A particle size of positive electrode slurry generally depends on a particle size of a sulfur-carbon composite included therein, however, the particle size of the sulfur-carbon composite decreases by a mixing process conducted for dispersion during a positive electrode slurry preparation process, and therefore, the particle size of the positive electrode slurry and the particle size of the sulfur-carbon composite are distinguished.

The positive electrode slurry including a sulfur-carbon composite, a binder, and a conductive material may have a particle size (based on $D_{50}$) of 15 µm to 50 µm, preferably greater than 15 µm and less than or equal to 30 µm, and more preferably 17 µm to 30 µm.

By the positive electrode slurry having a particle size (based on $D_{50}$) of 15 µm to 50 µm, the lithium-sulfur secondary battery including the same may have enhanced lifetime properties.

When the positive electrode slurry has a particle size (based on $D_{50}$) of less than 15 µm, adhesive strength for the positive electrode current collector decreases causing a problem of being detached from the positive electrode current collector, and lifetime properties may decline due to an occurrence of overpotential when driving the lithium-sulfur secondary battery. When the positive electrode slurry has a particle size (based on $D_{50}$) of greater than 50 µm on the contrary, particle size distribution of particles present in the positive electrode active material layer is widened increasing non-uniformity of the positive electrode active material layer, which may cause decline in the battery performance. In addition, scratches may occur when preparing the positive electrode since particles of the sulfur-carbon composite are too large, which may generate difficulties in preparing the positive electrode.

The sulfur-carbon composite is a positive electrode active material for a lithium secondary battery and comprises sulfur and carbon nanotubes, and more specifically, is a sulfur-carbon composite having a form in which sulfur is uniformly supported inside and outside carbon nanotubes.

In addition, the carbon nanotubes may be entangled type carbon nanotubes having a particle form with a particle size (based on $D_{50}$) of 15 µm to 50 µm. The entangled type means a form in which entangled carbon nanotubes aggregate to form a single particle, and is also referred to as a non-bundle type. Herein, the particle form means a particle in which no specific form is determined.

By controlling the particle size of the entangled type carbon nanotubes having a particle form through a milling process, the particle size of the sulfur-carbon composite and the particle size of the positive electrode slurry including the same may also be controlled.

The sulfur may be at least one selected from the group consisting of inorganic sulfur ($S_8$), $Li_2S_n$ (n≥1), and organosulfur compounds, and inorganic sulfur ($S_8$) may be preferably used.

The sulfur-carbon composite may include the sulfur and the carbon nanotubes in a weight ratio of 55:45 to 90:10. When the weight ratio of the sulfur and the carbon material included in the sulfur-carbon composite satisfies the above-mentioned range, conductivity may be maintained while enhancing battery capacity.

In addition, the sulfur-carbon composite may be prepared by, after mixing the carbon nanotubes and the sulfur, impregnating the sulfur into the carbon nanotubes using a melt diffusion method.

The sulfur-carbon composite may be included in an amount of 60% by weight to 95% by weight, preferably in an amount of 65% by weight to 95% by weight, and more preferably in an amount of 70% by weight to 90% by weight based on the total weight of the positive electrode slurry. When the sulfur-carbon composite is included in less than 60% by weight, battery performance may decline, and when the content is greater than 95% by weight, a content of the conductive material or the binder other than the positive electrode active material relatively decreases causing decline in the properties such as conductivity or durability.

The conductive material is not particularly limited, but may be, for example, graphite such as natural graphite or artificial graphite; carbon black such as carbon black (super-p), acetylene black, ketjen black, channel black, furnace black, lamp black, thermal black, or denka black; a conductive fiber such as carbon fiber or metal fiber; fluorocarbon, aluminum, and a metal powder such as nickel powder; a conductive whisker such as zinc oxide or potassium titanate; a conductive metal oxide such as titanium oxide; a conductive material such as a polyphenylene derivative, or the like. A content of the conductive material may be commonly from 0.05% by weight to 5% by weight based on the total weight of the positive electrode slurry.

As the binder in the positive electrode for a lithium secondary battery according to the present invention, styrene-butadiene rubber (SBR)/carboxymethyl cellulose (CMC), poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, a copolymer of polyhexafluoropropylene and polyvinylidene fluoride (product name: Kynar), poly(ethyl acrylate), polytetrafluoroethylene, polyvinyl chloride, polyacrylonitrile, polyvinyl pyridine, polystyrene, polyacrylic acid, derivatives, blends and copolymers thereof, and the like, may be used.

In addition, a content of the binder may be from 1% by weight to 20% by weight, preferably from 3% by weight to 18% by weight, and more preferably from 5% by weight to 15% by weight based on the total weight of the positive electrode slurry. When the content is less than the above-mentioned range, binding strength between the positive electrode active materials or between the positive electrode active material and the current collector decreases causing a decrease in electrode stability. In addition, polysulfide elution may also be suppressed due to interactions between the polysulfide and a specific functional group of a polymer chain used as the binder. When the content is greater than the above-mentioned range, battery capacity may decrease.

The positive electrode slurry may be prepared to a slurry state having a particle size (based on $D_{50}$) of 15 μm to 50 μm by mixing the sulfur-carbon composite, the conductive material, and the binder in a solvent, and the slurry having the particle size may be coated on a current collector, then dried and selectively rolled to prepare a positive electrode active material layer-formed positive electrode.

At this time, examples of the solvent to prepare the sulfur-carbon composite, the conductive material, and the binder to a slurry state may include acetonitrile, methanol, ethanol, tetrahydrofuran, water, isopropyl alcohol, and the like, but are not limited thereto.

In the positive electrode for a lithium secondary battery according to the present invention, the positive electrode current collector is not particularly limited as long as it has high conductivity without inducing chemical changes to the corresponding battery. For example, stainless steel, aluminum, nickel, titanium, baked carbon, or aluminum or stainless steel of which surface is treated with carbon, nickel, titanium, silver or the like, and the like, may be used. At this time, as the positive electrode current collector, various forms such as films having micro unevenness formed on the surface, sheets, foil, nets, porous bodies, foams or non-woven fabrics may be used so as to increase adhesive strength with the positive electrode active material.

In the present invention, the positive electrode is classified by an SC factor value represented by the following Mathematical Formula 2.

$$SC \text{ factor} = \alpha \times \frac{L}{P} \quad \text{[Mathematical Formula 2]}$$

In Mathematical Formula 2, P is porosity (%) of the positive electrode active material layer in the positive electrode, L is a mass of sulfur per unit area (mg/cm$^2$) of the positive electrode active material layer in the positive electrode, and α is 10 (constant).

The lithium secondary battery according to the present invention, preferably a lithium-sulfur secondary battery, accomplishes high energy density by an organic binding of, as well as the positive electrode described above, a negative electrode, a separator, an electrolyte and the like. According to one embodiment of the present invention, in order for the lithium secondary battery, preferably a lithium-sulfur secondary battery, to accomplish high energy density, the SC factor value may be greater than 0.45, and preferably 0.5 or greater. Although an upper limit of the SC factor value is not particularly limited in the present invention, the SC factor value may be 4.5 or less when considering actual operation example of the lithium-sulfur secondary battery. In conventional lithium secondary batteries, performance such as energy density of the battery declines when the SC factor value is greater than 0.45, however, in the lithium-sulfur secondary battery according to the present invention, battery performance is maintained without declining in actual operation.

Electrolyte Liquid

In the present invention, the electrolyte liquid is a non-aqueous electrolyte liquid including a lithium salt, and includes a lithium salt and a solvent. The electrolyte liquid has density of less than 1.5 g/cm$^3$. When the electrolyte liquid has density of 1.5 g/cm$^3$ or greater, the lithium secondary battery, preferably a lithium-sulfur secondary battery, is difficult to accomplish high energy density due to a weight increase in the electrolyte liquid.

The lithium salt is a material that may be readily dissolved in a non-aqueous organic solvent, and examples thereof may include at least one selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, chloroborane lithium, lower aliphatic carboxylic acid lithium, and lithium imide. In one embodiment of the present invention, the lithium salt may be preferably lithium imide such as LiTFSI.

The concentration of the lithium salt may be from 0.1 M to 8.0 M, preferably from 0.5 M to 5.0 M and more preferably from 1.0 to 3.0 M depending on various factors such as an accurate composition of the electrolyte liquid mixture, solubility of the salt, conductivity of the dissolved salt, charge and discharge conditions of a battery, a working temperature, and other factors known in the lithium secondary battery field. When the lithium salt concentration is less than the above-mentioned range, conductivity of the electrolyte liquid may decrease causing decline in the battery performance, and when the lithium salt concentration is greater than the above-mentioned range, viscosity of the electrolyte liquid increases leading to a decrease in the lithium ion (Li$^+$) mobility, and therefore, a proper concentration is preferably selected in the above-mentioned range.

The solvent includes a first solvent and a second solvent. The first solvent has a highest dipole moment per unit volume among the constituents included in an amount of 1% by weight or greater in the solvent, and accordingly, has high dipole moment and low viscosity. Using a solvent with a high dipole moment is effective in improving solid-state reactivity of sulfur, and such an effect may be obtained well when the solvent itself has low viscosity. In the present invention, the first solvent is classified by a DV$^2$ factor represented by the following Mathematical Formula 1.

$$DV^2 \text{ factor} = \gamma \times \frac{\mu}{DV} \quad \text{[Mathematical Formula 1]}$$

In Mathematical Formula 1, DV is a dipole moment per unit volume (debye (D)·mol/L), μ is viscosity of the solvent (cP, 25° C.), and γ is 100 (constant).

According to one embodiment of the present invention, the DV$^2$ factor value may be 1.75 or less, and preferably 1.5 or less. Although a lower limit of the DV$^2$ factor value is not particularly limited in the present invention, the DV$^2$ factor value may be 0.1 or greater when considering an actual operation example of the lithium secondary battery, preferably a lithium-sulfur secondary battery. Mixing a solvent having a DV² factor of 1.5 or less such as the first solvent may be advantageous for improving battery performance such as an improvement in lifetime properties when used in a lithium-sulfur secondary battery including a surface-modified sulfur-carbon composite as described above.

In the present invention, the first solvent is not particularly limited in the type as long as it has the DV² factor value included in the above-mentioned range, but may include at least one selected from the group consisting of propionitrile, dimethylacetamide, dimethylformamide, gamma-butyrolactone, triethylamine, and 1-iodopropane.

According to one embodiment of the present invention, the first solvent may be included in an amount of 1% by weight to 50% by weight, preferably in an amount of 5% by weight to 40% by weight, and more preferably in an amount of 10% by weight to 30% by weight based on the total weight of the solvent forming the electrolyte liquid. The solvent according to the present invention including the first solvent in the above-described % by weight range may be advantageous for improving battery performance such as an improvement in lifetime properties when used in a lithium-sulfur secondary battery including positive electrode slurry having low porosity, a high sulfur loading amount and a particle size (based on $D_{50}$) of 15 μm to 50 μm as described above.

The lithium secondary battery of the present invention is further classified by an NS factor combining the SC factor and the DV² factor. The NS factor is represented by the following Mathematical Formula 3.

$$NS\ factor = \frac{DV^2\ factor}{SC\ factor} \quad \text{[Mathematical Formula 3]}$$

In Mathematical Formula 3, SC factor has the same value as defined in Mathematical Formula 2, and DV² factor has the same value as defined in Mathematical Formula 1.

According to one embodiment of the present invention, the NS factor value may be 3.5 or less, preferably 3.0 or less, and more preferably 2.7 or less. Although a lower limit of the NS factor value is not particularly limited in the present invention, the NS factor value may be 0.1 or greater when considering an actual operation example of the lithium secondary battery, preferably a lithium-sulfur secondary battery. When the NS factor value is adjusted to be in the above-mentioned range, an effect of improving performance of the lithium-sulfur secondary battery may be more superior.

In the present invention, the second solvent is a fluorinated ether-based solvent. In order to control viscosity of an electrolyte liquid, solvents such as dimethoxyethane and dimethyl carbonate have been used as a diluent in the prior art, and when using such a solvent as a diluent, a battery including a positive electrode having a positive electrode slurry particle size corresponding to a certain range while being high loading and low porosity as in the present invention may not be driven.

Accordingly, in the present invention, the second solvent is added with the first solvent in order to drive the positive electrode according to the present invention. The second solvent is not particularly limited in the type as long as it is a fluorinated ether-based solvent generally used in the art, but may include at least one selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H,1H,2'H-perfluorodipropyl ether.

According to one embodiment of the present invention, the second solvent may be included in an amount of 50% by weight to 99% by weight, preferably in an amount of 60% by weight to 95% by weight, and more preferably in an amount of 70% by weight to 90% by weight based on the total weight of the solvent forming the electrolyte liquid. The solvent according to the present invention including the second solvent in the range of 50% by weight to 99% by weight may be, like the first solvent, advantageous for improving battery performance such as an improvement in lifetime properties when used in a lithium-sulfur secondary battery including positive electrode slurry having a particle size (based on $D_{50}$) of 15 μm to 50 μm as described above.

When mixing the first solvent and the second solvent, the second solvent may be included in the electrolyte liquid in the same or more amount compared to the first solvent considering a battery performance improving effect. According to one embodiment of the present invention, the solvent may include the first solvent and the second solvent in a weight ratio of 1:1 to 1:9 and preferably 3:7 to 1:9 (first solvent:second solvent).

The non-aqueous electrolyte liquid for a lithium-sulfur battery of the present invention may further include a nitrate or nitrite-based compound as an additive. The nitrate or nitrite-based compound is effective in forming a stable film on the lithium electrode and enhancing charge and discharge efficiency. Such a nitrate or nitrite-based compound is not particularly limited in the present invention, however, one type selected from the group consisting of inorganic-based nitrate or nitrite compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$), and nitrite ammonium ($NH_4NO_2$); organic-base nitrate or nitrite compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, and octyl nitrite; organic nitro compounds such as nitromethane, nitropropane, nitrobutane, nitrobenzene, dinitrobenzene, nitro pyridine, dinitropyridine, nitrotoluene, and dinitrotoluene, and combinations thereof may be used, and preferably, lithium nitrate is used.

In addition, the non-aqueous electrolyte liquid may further include other additives with the purpose of improving charge and discharge properties, flame retardancy and the like. Examples of the additive may include pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride, fluoroethylene carbonate (FEC), propene sultone (PRS), vinylene carbonate (VC), and the like.

Negative Electrode

The negative electrode for a lithium secondary battery of the present invention may include a negative electrode current collector; and a negative electrode active material layer formed on at least one surface of the current collector.

The negative electrode active material layer includes a negative electrode active material, a binder, and a conductive material. As the negative electrode active material, a material capable of reversibly intercalating or deintercalating lithium ions ($Li^+$), a material capable of reversibly forming a lithium-containing compound by reacting with lithium ions, lithium metal or a lithium alloy may be used.

Examples of the material capable of reversibly intercalating or deintercalating lithium ions may include crystalline carbon, amorphous carbon, or a mixture thereof.

Examples of the material capable of reversibly forming a lithium-containing compound by reacting with lithium ions may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The binder, the conductive material and the negative electrode current collector may be the same as the materials used in the positive electrode described above.

Separator

The separator in the present invention is a physical separator having a function of physically separating the electrodes, and is not particularly limited in the use as long as it is used as a common separator, and those having an excellent electrolyte liquid moisture-containing ability while having low resistance for ion migration of the electrolyte liquid are particularly preferred.

In addition, the separator enables lithium ion transport between the positive electrode and the negative electrode while separating or insulating the positive electrode and the negative electrode from each other. Such a separator may be formed with porous, that is, 30% to 50% porosity, and non-conductive or insulating materials.

Specifically, porous polymer films, for example, porous polymer films prepared with a polyolefin-based polymer such as an ethylene homopolymer, a propylene homopolymer, an ethylene/butene copolymer, an ethylene/hexene copolymer, and an ethylene/methacrylate copolymer may be used, or non-woven fabrics made of high melting point glass fiber or the like may be used. Among these, a porous polymer film is preferably used.

When using a polymer film as both a buffer layer and the separator, the amount of electrolyte liquid impregnation and ion conducting properties decline, and effects of reducing an overpotential and improving capacity properties become insignificant. Meanwhile, when using a non-woven fabric material as the both, mechanical strength is not secured causing a battery short circuit problem. However, when using a film-type separator and a polymer non-woven fabric buffer layer together, mechanical strength may also be secured together with an effect of improving battery performance obtained by employing the buffer layer.

According to preferred one embodiment of the present invention, an ethylene homopolymer (polyethylene) polymer film is used as the separator, and a polyimide non-woven fabric is used as the buffer layer. Herein, the polyethylene polymer film preferably has a thickness of 10 μm to 25 μm and porosity of 40% to 50%.

The lithium secondary battery of the present invention, preferably a lithium-sulfur secondary battery, may be manufactured by disposing a separator between a positive electrode and a negative electrode to form an electrode assembly, placing the electrode assembly in a cylindrical battery case or an angular battery case, and then injecting an electrolyte thereto. Alternatively, the lithium-sulfur secondary battery of the present invention may be manufactured by laminating the electrode assembly, impregnating the electrode assembly into an electrolyte, and placing the obtained result in a battery case and sealing the result.

The lithium secondary battery according to the present invention, preferably a lithium-sulfur secondary battery, is classified by an ED factor value represented by the following Mathematical Formula 4.

$$ED \text{ factor} = V \times SC \text{ factor} \times \frac{C}{D} \quad \text{[Mathematical Formula 4]}$$

In Mathematical Formula 4, V is a discharge nominal voltage (V) for $Li/Li^+$, D is density ($g/cm^3$) of the electrolyte liquid, C is discharge capacity (mAh/g) when discharging at a 0.1 C rate, and SC factor has the same value as defined in Mathematical Formula 2. The ED factor may accomplish high energy density in an actual lithium-sulfur secondary battery as the value is higher.

According to a specific example of the present invention, the ED factor value may be 850 or greater, preferably 870 or greater, and more preferably 891 or greater. Although an upper limit of the ED factor value is not particularly limited in the present invention, the ED factor value may be 10,000 or less when considering an actual operation example of the lithium-sulfur secondary battery. The ED factor value range means that the lithium-sulfur secondary battery according to the present invention is capable of obtaining more enhanced energy density compared to conventional lithium-sulfur secondary batteries.

In addition, the present invention provides a battery module including the lithium secondary battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

MODE FOR INVENTION

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

<Manufacture of Lithium-Sulfur Secondary Battery>

Example 1

Entangled type carbon nanotubes having a particle size (based on $D_{50}$) of 100 μm to 150 μm were prepared to entangled type carbon nanotubes having a reduced particle size (based on $D_{50}$) using a ball mill.

After mixing the particle size (based on $D_{50}$)-reduced entangled type carbon nanotubes and sulfur, the mixture was prepared to a sulfur-carbon composite using a melt diffusion method for 30 minutes at a temperature of 155° C.

In the sulfur-carbon composite, the sulfur and the entangled type carbon nanotubes had a weight ratio of 70:30.

90% by weight of the sulfur-carbon composite, 5% by weight of styrene butadiene rubber/carboxymethyl cellulose (weight ratio of SBR/CMC 7:3) as a binder, and 5% by weight of denka black as a conductive material were mixed, and dissolved in water to prepare positive electrode slurry having a concentration (concentration based on solid content) of 20%. A particle size of the positive electrode slurry was measured using a particle size analyzer (PSA), and the positive electrode slurry had a particle size (based on $D_{50}$) of 27 μm.

The positive electrode slurry was coated on an aluminum current collector to form a positive electrode active material layer, and the layer was dried and rolled to prepare a positive electrode. In the prepared positive electrode, porosity of the positive electrode active material layer calculated based on the measurements of electrode weight and electrode thickness (using a TESA-μHITE device manufactured by TESA) was 60%, and a mass of sulfur per unit area of the positive electrode active material layer was 4.54 mg/cm². An SC factor value calculated based thereon was 0.757.

The positive electrode and a negative electrode were placed to face each other, and a polyethylene separator having a thickness of 20 μm and porosity of 45% was interposed between the positive electrode and the negative electrode. Herein, lithium foil having a thickness of 60 μm was used as the negative electrode.

After that, an electrolyte liquid was injected into the case to manufacture a lithium-sulfur secondary battery.

Herein, the electrolyte liquid was prepared by dissolving lithium bis(trifluoromethylsulfonyl)imide (LiTFSI) having a concentration of 3.0 M concentration in an organic solvent, and as the organic solvent herein, a solvent obtained by mixing propionitrile (first solvent) and 1H,1H,2'H,3H-decafluorodipropyl ether (second solvent) in a 3:7 weight ratio (w/w) was used. A dipole moment per unit volume was 97.1 D·mol/L in the first solvent, and viscosity of the solvent measured using a LVDV2T-CP viscometer manufactured by BROOKFIELD AMETEK Inc. was 0.38 cP (25° C.). A $DV^2$ factor value calculated based thereon was 0.39. The manufactured battery was charged and discharged at 45° C.

Example 2

Using a ball mill, entangled type carbon nanotubes having a particle size (based on $D_{50}$) of 100 μm to 150 μm was prepared to entangled type carbon nanotubes having a particle size (based on $D_{50}$) more reduced compared to Example 1 by increasing a ball mill time compared to Example 1.

Processes thereafter were conducted in the same manner as in Example 1 to manufacture a lithium-sulfur secondary battery. A particle size of the positive electrode slurry of Example 2 was measured using a particle size analyzer (PSA), and the positive electrode slurry had a particle size (based on $D_{50}$) of 24 μm.

In the prepared positive electrode, porosity of the positive electrode active material layer calculated based on the measurements of electrode weight and electrode thickness (using a TESA-μHITE device manufactured by TESA) was 60%, and a mass of sulfur per unit area of the positive electrode active material layer was 4.54 mg/cm². An SC factor value calculated based thereon was 0.757.

Example 3

Using a ball mill, entangled type carbon nanotubes having a particle size (based on $D_{50}$) of 100 μm to 150 μm was prepared to entangled type carbon nanotubes having a particle size (based on $D_{50}$) more reduced compared to Example 2 by increasing a ball mill time compared to Example 2.

Processes thereafter were conducted in the same manner as in Example 1 to manufacture a lithium-sulfur secondary battery. A particle size of the positive electrode slurry of Example 3 was measured using a particle size analyzer (PSA), and the positive electrode slurry had a particle size (based on $D_{50}$) of 18 μm.

In the prepared positive electrode, porosity of the positive electrode active material layer calculated based on the measurements of electrode weight and electrode thickness (using a TESA-μHITE device manufactured by TESA) was 60%, and a mass of sulfur per unit area of the positive electrode active material layer was 4.35 mg/cm². An SC factor value calculated based thereon was 0.725.

Example 4

Using a ball mill, entangled type carbon nanotubes having a particle size (based on $D_{50}$) of 100 μm to 150 μm was prepared to entangled type carbon nanotubes having a particle size (based on $D_{50}$) than Example 3 by increasing a ball mill time compared to Example 3.

Processes thereafter were conducted in the same manner as in Example 1 to manufacture a lithium-sulfur secondary battery. A particle size of the positive electrode slurry of Example 4 was measured using a particle size analyzer (PSA), and the positive electrode slurry had a particle size (based on $D_{50}$) of 15 μm.

In the prepared positive electrode, porosity of the positive electrode active material layer calculated based on the measurements of electrode weight and electrode thickness (using a TESA-μHITE device manufactured by TESA) was 60%, and a mass of sulfur per unit area of the positive electrode active material layer was 4.6 mg/cm². An SC factor value calculated based thereon was 0.767.

Comparative Example 1

Using a ball mill, entangled type carbon nanotubes having a particle size (based on $D_{50}$) of 100 μm to 150 μm was prepared to entangled type carbon nanotubes having a particle size (based on $D_{50}$) more reduced compared to Example 4 by increasing a ball mill time compared to Example 4.

Processes thereafter were conducted in the same manner as in Example 1 to manufacture a lithium-sulfur secondary battery. A particle size of the positive electrode slurry of Comparative Example 1 was measured using a particle size analyzer (PSA), and the positive electrode slurry had a particle size (based on $D_{50}$) of 11 μm.

In the prepared positive electrode, porosity of the positive electrode active material layer calculated based on the measurements of electrode weight and electrode thickness (using a TESA-μHITE device manufactured by TESA) was 60%, and a mass of sulfur per unit area of the positive electrode active material layer was 4.73 mg/cm². An SC factor value calculated based thereon was 0.788.

Comparative Example 2

Using a ball mill, entangled type carbon nanotubes having a particle size (based on $D_{50}$) of 100 μm to 150 μm was prepared to entangled type carbon nanotubes having a particle size (based on $D_{50}$) more reduced compared to Example 4 by increasing a ball mill time compared to Example 4.

Processes thereafter were conducted in the same manner as in Example 1 to manufacture a lithium-sulfur secondary battery. A particle size of the positive electrode slurry of Comparative Example 2 was measured using a particle size analyzer (PSA), and the positive electrode slurry had a particle size (based on $D_{50}$) of 8 μm.

In the prepared positive electrode, porosity of the positive electrode active material layer calculated based on the measurements of electrode weight and electrode thickness (using a TESA-μHITE device manufactured by TESA) was 60%, and a mass of sulfur per unit area of the positive electrode active material layer was 4.37 mg/cm$^2$. An SC factor value calculated based thereon was 0.728.

Comparative Example 3

Using a ball mill, entangled type carbon nanotubes having a particle size (based on $D_{50}$) of 100 μm to 150 μm was prepared to entangled type carbon nanotubes having the same particle size (based on $D_{50}$) as Example 4 by ball milling for the same time as Example 4.

Processes thereafter were conducted in the same manner as in Example 1 to manufacture a lithium-sulfur secondary battery. A particle size of the positive electrode slurry of Comparative Example 3 was measured using a particle size analyzer (PSA), and the positive electrode slurry had a particle size (based on $D_{50}$) of 15 μm.

In the prepared positive electrode, porosity of the positive electrode active material layer calculated based on the measurements of electrode weight and electrode thickness (using a TESA-μHITE device manufactured by TESA) was 60%, and a mass of sulfur per unit area of the positive electrode active material layer was 2.7 mg/cm$^2$. An SC factor value calculated based thereon was 0.45.

Conditions of Examples 1 to 4 and Comparative Examples 1 to 3 were summarized and shown in the following Table 1.

TABLE 1

| | Particle Size of Positive Electrode Slurry ($D_{50}$, μm) | SC factor | DV$^2$ factor | NS factor | ED factor |
|---|---|---|---|---|---|
| Example 1 | 27 | 0.757 | 0.39 | 0.515 | 1433.185 |
| Example 2 | 24 | 0.757 | 0.39 | 0.515 | 1422.955 |
| Example 3 | 18 | 0.725 | 0.39 | 0.538 | 1434.375 |
| Example 4 | 15 | 0.767 | 0.39 | 0.508 | 1392.043 |
| Comparative Example 1 | 11 | 0.788 | 0.39 | 0.495 | 1359.417 |
| Comparative Example 2 | 8 | 0.728 | 0.39 | 0.535 | 992.8758 |
| Comparative Example 3 | 15 | 0.45 | 0.39 | 0.866 | 822.1622 |

Experimental Example 1. Evaluation on Battery Performance

ED factor values of the lithium-sulfur secondary batteries according to Examples 1 to 4 and Comparative Examples 1 to 3 were measured using a charge and discharge measurement device (LAND CT-2001A, Wuhan, China) while conducting charge-discharge at current density of 0.1 C during initial 5 cycles, and then conducting 0.1 C charge and 0.3 C discharge thereafter. Results obtained herein were shown in FIG. 1.

From the results of FIG. 1, the lithium-sulfur secondary batteries of Examples 1 to 4 having a positive electrode slurry particle size (based on $D_{50}$) of 15 μm to 50 μm exhibited results of superior lifetime properties. In Example 4, the positive electrode slurry had a particle size (based on $D_{50}$) of 15 μm, which was not as superior as in Examples 1 to 3 in the lifetime properties, however, Example 4 had a superior result compared to Comparative Example 1. Accordingly, it was seen that the positive electrode slurry particle size (based on $D_{50}$) had a critical significance at 15 μm.

Comparative Examples 1 and 2 had a positive electrode slurry particle size (based on $D_{50}$) of less than 15 μm, and it was seen that the ED factor rapidly decreased as the cycle was repeated. In addition, Comparative Example 3 had an SC factor of 0.45 or less, and it was seen that low energy density was obtained with an ED factor of approximately 800 during a charge and discharge cycle.

Accordingly, it was seen that battery lifetime properties were superior when the positive electrode slurry had a particle size (based on $D_{50}$) of 15 μm to 50 μm.

The invention claimed is:
1. A lithium secondary battery comprising:
a positive electrode;
a negative electrode;
a separator interposed therebetween; and
an electrolyte liquid,
wherein the positive electrode includes a positive electrode current collector; and a positive electrode active material layer formed on at least one surface of the positive electrode current collector,
wherein the positive electrode active material layer is formed of a positive electrode slurry including a sulfur-carbon composite comprising sulfur and particle-formed entangled carbon nanotubes, a binder, and a conductive material,
wherein the positive electrode slurry has a particle size based on $D_{50}$ of 15 μm to 30 μm,
wherein the electrolyte liquid comprises a solvent and a lithium salt,
wherein the solvent comprises a first solvent having a DV$^2$ factor value represented by the following Mathematical Formula 1 of 1.75 or less; and a second solvent that is a fluorinated ether-based solvent, wherein the first solvent is at least one selected from the group consisting of propionitrile, dimethylacetamide, dimethylformamide, triethylamine, and 1-iodopropane:

$$DV^2 \text{ factor} = \gamma \times \frac{\mu}{DV} \qquad \text{[Mathematical Formula 1]}$$

in Mathematical Formula 1,
DV is a dipole moment per unit volume (D·mol/L);
μ is viscosity of the first solvent (cP, 25° C.); and
γ is 100,
wherein the DV$^2$ factor defines the relationship between μ, γ, and DV, and
wherein the positive electrode has an SC factor value represented by the following Mathematical Formula 2 of greater than 0.45 and 4.5 or less:

$$SC \text{ factor} = \alpha \times \frac{L}{P} \quad \text{[Mathematical Formula 2]}$$

in Mathematical Formula 2,
P is porosity (%) of the positive electrode active material layer in the positive electrode;
L is a mass of sulfur per unit area (mg/cm2) of the positive electrode active material layer in the positive electrode; and
α is 10,
wherein the SC factor defines the relationship between α, P, and L.

2. The lithium secondary battery of claim 1, wherein the first solvent has a $DV^2$ factor value of 1.5 or less.

3. The lithium secondary battery of claim 1, wherein the lithium secondary battery has an NS factor value represented by the following Mathematical Formula 3 of 3.5 or less:

$$NS \text{ factor} = \frac{DV^2 \text{ factor}}{SC \text{ factor}} \quad \text{[Mathematical Formula 3]}$$

in Mathematical Formula 3,
SC factor has the same value as defined in Mathematical Formula 2; and
$DV^2$ factor has the same value as defined in Mathematical Formula 1,
wherein the NS factor defines the relationship between the $DV^2$ factor and the SC factor.

4. The lithium secondary battery of claim 1, wherein the lithium secondary battery has an ED factor value represented by the following Mathematical Formula 4 of 850 or greater:

$$ED \text{ factor} = V \times SC \text{ factor} \times \frac{C}{D} \quad \text{[Mathematical Formula 4]}$$

in Mathematical Formula 4,
V is a discharge nominal voltage (V) for Li/Li$^+$;
D is density (g/cm$^3$) of the electrolyte liquid;
C is discharge capacity (mAh/g) when discharging at a 0.1 C rate; and
SC factor has the same value as defined in Mathematical Formula 2,
wherein the ED factor defines the relationship between V, SC factor, C and D.

5. The lithium secondary battery of claim 1, wherein the second solvent is at least one selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H,1H,2'H-perfluorodipropyl ether.

6. The lithium secondary battery of claim 1, wherein the first solvent is present in the solvent in an amount of from 1% by weight to 50% by weight based on a total weight of the solvent.

7. The lithium secondary battery of claim 1, wherein the second solvent is present in the solvent in an amount from 50% by weight to 99% by weight based on a total weight of the solvent.

8. The lithium secondary battery of claim 1, wherein the first solvent and the second solvent are present in the solvent in a weight ratio of 1:1 to 1:9.

9. The lithium secondary battery of claim 1, wherein the lithium secondary battery is a lithium-sulfur secondary battery.

10. The lithium secondary battery of claim 1, wherein the first solvent is propionitrile.

11. The lithium secondary battery of claim 1, wherein the second solvent is 1H,1H,2'H,3H-decafluorodipropyl ether.

12. The lithium secondary battery of claim 1, wherein the SC factor value is greater than 0.45 and 0.767 or less.

* * * * *